US012689967B2

(12) United States Patent
Saha

(10) Patent No.: US 12,689,967 B2
(45) Date of Patent: Jul. 21, 2026

(54) MOBILE APPLICATION TRIGGERED NETWORK SLICE MANAGEMENT

(71) Applicant: Boost SubscriberCo L.L.C., Englewood, CO (US)

(72) Inventor: Sougata Saha, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 327 days.

(21) Appl. No.: 18/584,705

(22) Filed: Feb. 22, 2024

(65) Prior Publication Data

US 2024/0414620 A1      Dec. 12, 2024

Related U.S. Application Data

(60) Provisional application No. 63/507,353, filed on Jun. 9, 2023.

(51) Int. Cl.
*H04W 40/12*      (2009.01)
*H04W 40/24*      (2009.01)

(52) U.S. Cl.
CPC ......... *H04W 40/12* (2013.01); *H04W 40/248* (2013.01)

(58) Field of Classification Search
CPC ........ H04L 5/14; H04W 40/12; H04W 40/248
See application file for complete search history.

(56) References Cited

U.S. PATENT DOCUMENTS

| | | | |
|---|---|---|---|
| 10,084,926 B1 * | 9/2018 | Jenzeh ................... | H04W 4/12 |
| 2013/0290549 A1 * | 10/2013 | Cho ....................... | H04L 67/14 |
| | | | 709/228 |
| 2020/0007655 A1 | 1/2020 | Namiranian | |
| 2020/0351761 A1 * | 11/2020 | Horna ................... | H04W 48/02 |
| 2021/0014668 A1 * | 1/2021 | Osterwise .......... | G06F 9/45558 |
| 2021/0136672 A1 | 5/2021 | Jagannatha et al. | |
| 2022/0141713 A1 | 5/2022 | Jagannatha et al. | |
| 2022/0201601 A1 | 6/2022 | Cai et al. | |
| 2023/0119308 A1 | 4/2023 | Jagannatha et al. | |
| 2023/0370822 A1 * | 11/2023 | Lei .......................... | H04W 4/44 |

* cited by examiner

*Primary Examiner* — Bailor C Hsu
(74) *Attorney, Agent, or Firm* — Kilpatrick Townsend & Stockton LLP

(57) ABSTRACT

Various arrangements for cellular network slice usage management are presented herein. In response to an application being launched for execution, an access point name (APN) list update request can be transmitted. In response, an APN list update can be transmitted back to the UE based on the application being executed. The UE's stored APN list can be updated based on the APN list update. The UE can then determine a bearer slice to use for cellular network communications based on the updated stored APN list.

20 Claims, 5 Drawing Sheets

500

Launch an application for execution on a UE  510

Determine the application launched for execution  520

In response to the application being executed, transmitting an APN update request to OTA update server  530

Analyze, by the OTA update server, the APN update request  540

Based on the analysis, transmit an OTA APN list update to the UE  550

Update a stored APN list by the UE such that only one bearer option is available for the service corresponding to the application launched for execution  560

Determine a bearer slice to use for communications for the application based on the updated APN list  570

Access cellular network using the bearer from the modified APN list for communications involving the application  580

| 5QI | Resource Type | Priority Level | Packet Error Loss Rate ($10^n$) | Packet Delay Budget (ms) | Default Max. Data Burst Volume (bytes) | Example Services |
|---|---|---|---|---|---|---|
| 1 | GBR | 20 | -2 | 100 | - | Voice |
| 2 | GBR | 40 | -3 | 150 | - | Live Video Streaming |
| 3 | GBR | 30 | -3 | 50 | - | Gaming, V2X messaging, process automation |
| 4 | GBR | 50 | -6 | 300 | - | Buffered Video Streaming |
| 5 | Non-GBR | 10 | -6 | 100 | - | IMS Signaling |
| 6 | Non-GBR | 60 | -6 | 300 | - | Buffered Video Streaming, web, email, chat, file transfer |
| 7 | Non-GBR | 70 | -3 | 100 | - | Voice, live video streaming, interactive gaming |
| 8 | Non-GBR | 80 | -6 | 300 | - | Buffered Video Streaming, web, email, chat, file transfer |
| 9 | Non-GBR | 90 | -6 | 300 | - | Buffered Video Streaming, web, email, chat, file transfer |
| 65 | GBR | 7 | -2 | 75 | - | Mission Critical User Plane Push to Talk Voice Services |
| 66 | GBR | 20 | -2 | 100 | - | Non-mission Critical User Plane Push to Talk Voice Services |
| 67 | GBR | 15 | -3 | 100 | - | Mission Critical Video User Plane |
| 69 | Non-GBR | 5 | -5 | 60 | - | Mission Critical Delay-Sensitive Signaling |
| 70 | Non-GBR | 55 | -6 | 200 | - | Mission Critical Data |
| 75 | GBR | 25 | -2 | 50 | - | V2X Messages |
| 79 | Non-GBR | 65 | -2 | 50 | - | V2X Messages |
| 80 | Non-GBR | 68 | -6 | 10 | - | Low-latency enhanced mobile broadband applications, augmented reality |
| 82 | Delay Critical GBR | 19 | -4 | 10 | 255 | Discrete Automation |
| 83 | Delay Critical GBR | 22 | -4 | 10 | 1354 | Discrete Automation |
| 84 | Delay Critical GBR | 24 | -5 | 30 | 1354 | Intelligent Transport Systems |
| 85 | Delay Critical GBR | 21 | -5 | 5 | 255 | Electricity Distribution (High Voltage) |

Storage

Application

<u>314-1</u>

Application

<u>314-2</u>

Application

<u>314-3</u>

<u>313</u>

Processing System

Operating System

APN Trigger Engine

<u>316</u>

<u>312</u>

<u>311</u>

315

APN List

<u>310</u>

320

OTA Update Server   332

OTA APN Update Engine

<u>331</u>

Application APN Mapping

<u>330</u>

Internet

<u>321</u>

400

UE

Storage

Application 314-1

Application 314-2

Application 314-3

313

Processing System

Application

APN
Request
Engine

410

314-2

311

315

APN
List

310

320

OTA Update Server    332

OTA APN
Update
Engine

331

Application
APN
Mapping

330

500

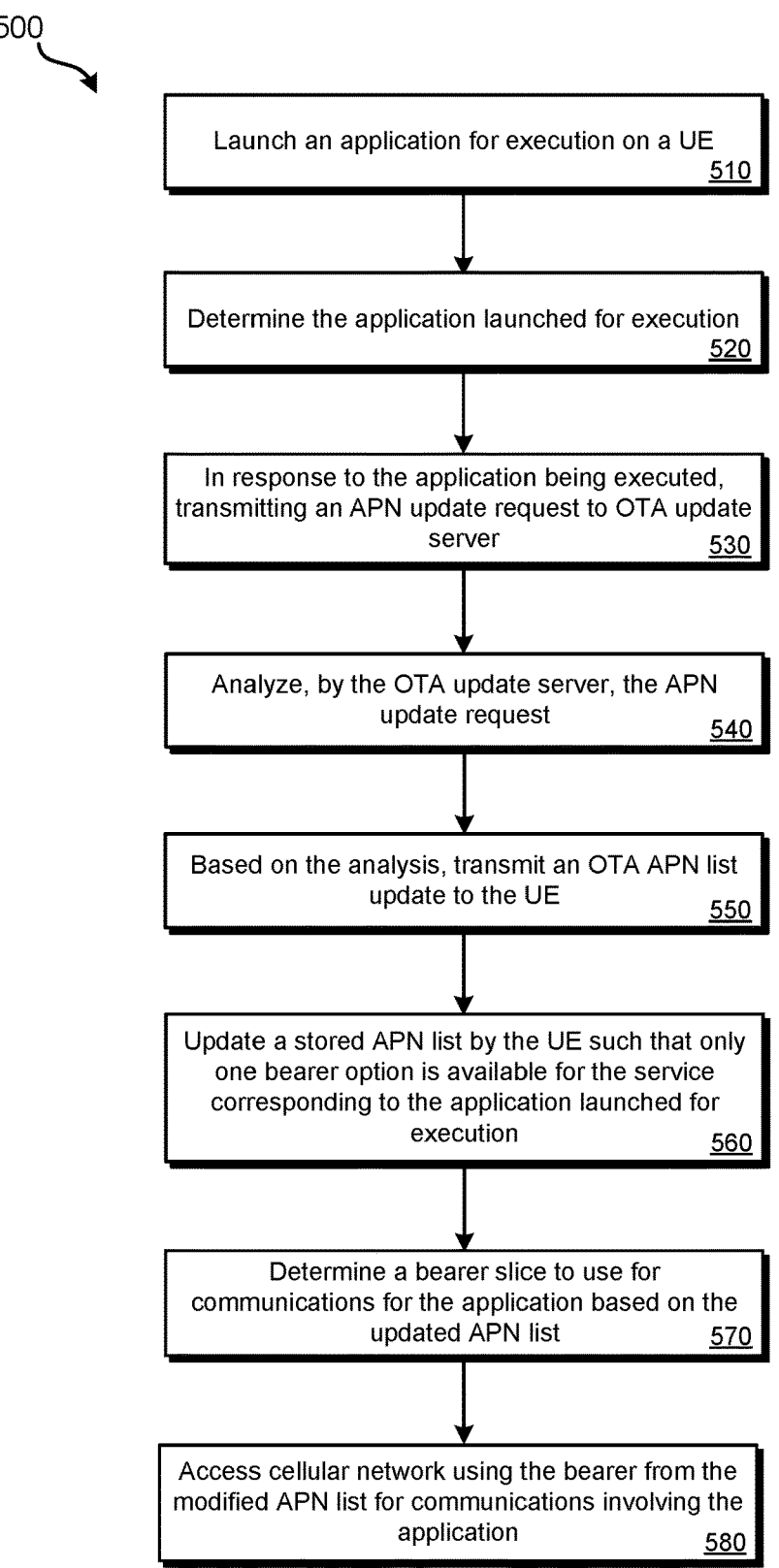

Launch an application for execution on a UE
510

Determine the application launched for execution
520

In response to the application being executed, transmitting an APN update request to OTA update server
530

Analyze, by the OTA update server, the APN update request
540

Based on the analysis, transmit an OTA APN list update to the UE
550

Update a stored APN list by the UE such that only one bearer option is available for the service corresponding to the application launched for execution
560

Determine a bearer slice to use for communications for the application based on the updated APN list
570

Access cellular network using the bearer from the modified APN list for communications involving the application
580

FIG. 5

MOBILE APPLICATION TRIGGERED NETWORK SLICE MANAGEMENT

CROSS REFERENCE TO RELATED APPLICATIONS

This application claims priority to U.S. Provisional Patent Application No. 63/507,353, filed on Jun. 9, 2023, entitled "Mobile Application Triggered Network Slice Management," the disclosure of which is incorporated by reference in its entirety for all purposes.

BACKGROUND

Different functions performed on a cellular network-enabled device can have significantly different needs. For example, for a telephone call, having low latency and relatively few dropped packets may be a priority. However, for other uses, such as streaming high-definition video, downlink bandwidth may be the priority. Effective management of which slice of a cellular network user equipment (UE) to use for communication is needed.

SUMMARY

Various arrangements are presented for cellular network slice management by causing an application executed by a UE to use a particular bearer for network access. In some embodiments, a method is presented for cellular network slice management. The method can include determining, by a user equipment (UE), that an application stored on the user equipment has been launched for execution. The method can include, in response to determining the application has launched for execution, transmitting an access point name (APN) list update request to a remote server system. The APN list update request can include an application identifier mapped to the application launched for execution. The method can include analyzing, by the remote server system, the APN list update request based on the application identifier. The method can include transmitting, by the remote server system, an APN list update to the UE based on analyzing the APN list update request. The method can include updating, by the UE, a stored APN list based on the APN list update. The method can include determining, by the UE, for the application, a bearer slice to use for cellular network communications based on the updated stored APN list. The method can include communicating, by the UE, via the bearer slice of a cellular network for data communications of the application.

Embodiments can include one or more of the following features: The transmitted APN list update can include a single bearer slice specified for a service type mapped to the application. The bearer slice for the service type mapped to the application can differ in the stored APN list from the APN list update. The service type can be an Internet bearer. The APN list update request can be transmitted via the cellular network to the remote server system. The remote server system may be an over-the-air (OTA) update server system operating as part of the cellular network. The bearer slice can meet quality of service (QoS) parameters consistent with 5QI 80. Updating the stored APN list based on the APN list update can include storing the updated stored APN list to a subscriber identification module (SIM) card of the UE.

In some embodiments, a cellular network system is presented. The system can include a cellular network comprising an update server system and a plurality of base stations, wherein the update server system comprises an application access point name (APN) mapping database. The system can include a plurality of user equipment (UE). Each of the UE can be configured to determine that an application stored on the user equipment has been launched for execution. Each UE can be configured to, in response to determining the application has launched for execution, transmit an access point name (APN) list update request to the update server system. The APN list update request can include an application identifier mapped to the application launched for execution. The update server system can analyze the APN list update request based on the application identifier and transmits an APN list update message to the UE based on analyzing the APN list update request. Each UE can be configured to receive the APN list update message from the update server system. Each UE can be configured to update a stored APN list based on the APN list update. Each UE can be configured to communicate via a slice of a cellular network for data communications of the application determined based on the updated stored APN list.

Embodiments of such a system can include one or more of the following features: The transmitted APN list update can include a single bearer slice specified for a service type mapped to the application. The bearer slice for the service type mapped to the application can differ in the stored APN list from the APN list update. The service type may be an Internet bearer. The APN list update request can be transmitted via the cellular network to the update server system. The update server system is an over-the-air (OTA) update server system operating as part of the cellular network. The slice can meet quality of service (QoS) parameters consistent with 5QI 80. Each UE of the plurality of UE being configured to update the stored APN list based on the APN list update can include each UE of the plurality of UE being configured to store the updated stored APN list to a subscriber identification module (SIM) card.

In some embodiments, a UE is present. The UE can include a processing system, comprising one or more processors, that executes an operating system. The UE's processing system can be configured to determine that an application stored on the user equipment has been launched for execution. The UE's processing system can be configured to, in response to determining the application has launched for execution, transmit an access point name (APN) list update request to an update server system. The APN list update request can include an application identifier mapped to the application launched for execution. The update server system can analyze the APN list update request based on the application identifier and transmits an APN list update message to the UE based on analyzing the APN list update request. The UE's processing system can be configured to receive the APN list update message from the update server system. The UE's processing system can be configured to update a stored APN list based on the APN list update. The UE's processing system can be configured to communicate via a slice of a cellular network for data communications of the application determined based on the updated stored APN list.

Such UE can include one or more of the following features: The transmitted APN list update can include a single bearer slice specified for a service type mapped to the application. The bearer slice for the service type mapped to the application can differ in the stored APN list from the APN list update. The user equipment can be a cellular phone on which a user selects the application for launch via a touchscreen.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguish among the similar components. If only the first reference label is used in the specification, the description is applicable to any one of the similar components having the same first reference label irrespective of the second reference label.

FIG. 1 illustrates an embodiment of example 5G Quality of Service identifiers (5QI) and example services.

FIG. 5 illustrates an embodiment of a method for cellular network slice management by causing an application executed by a UE to use a particular bearer for network access.

DETAILED DESCRIPTION

Figure 2:
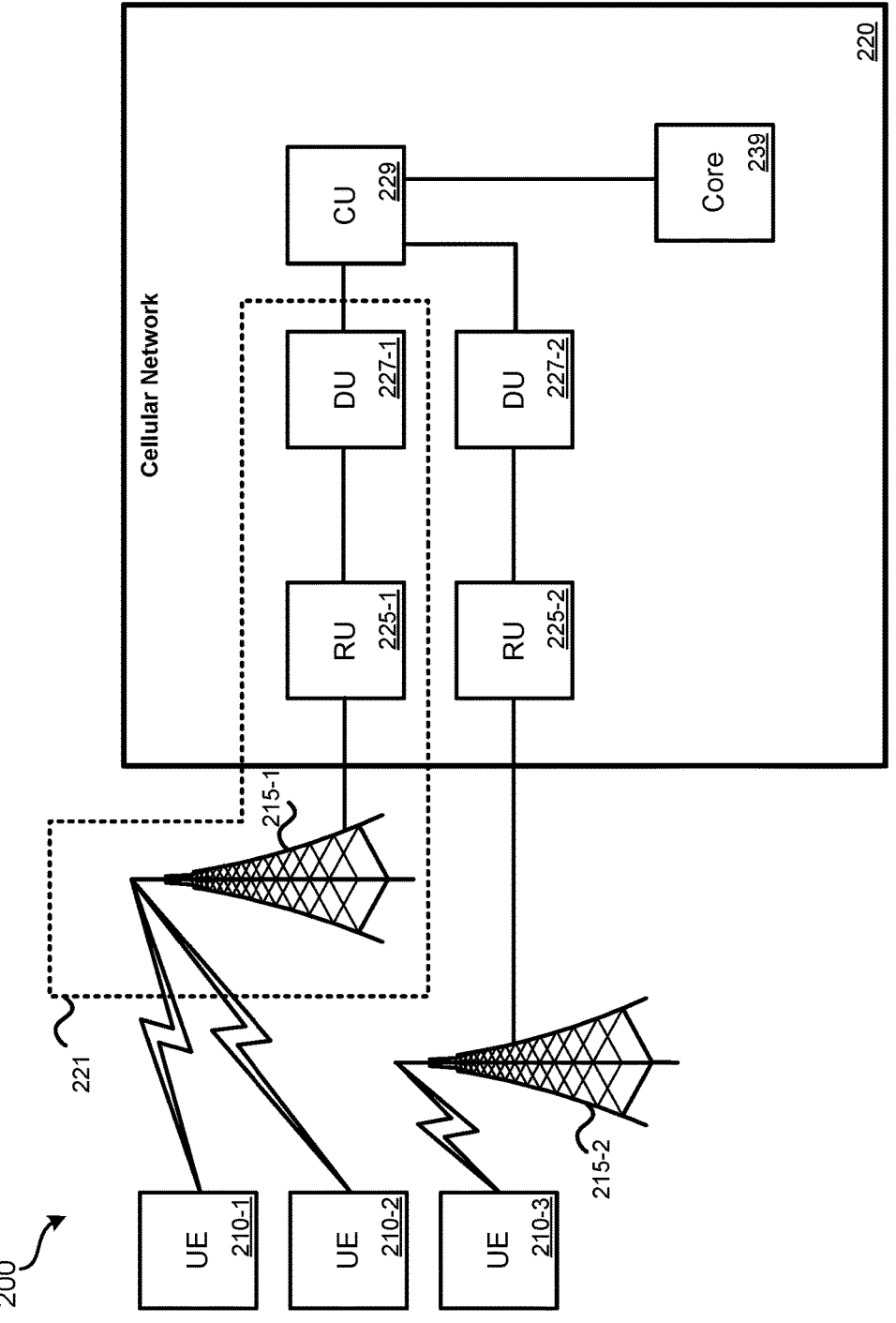
FIG. 2 illustrates an embodiment of a block diagram of a 5G New Radio (NR) cellular network.

5QI refers to 5G Quality of Service (QoS) identifiers for 5G New Radio (NR) cellular networks. 5QI refers to standardized groups of QoS characteristics, which can include parameters for characteristics such as: priority level, packet delay, packet error rate, jitter, downlink bandwidth (per piece of user equipment), uplink bandwidth (per piece of user equipment), etc. One particular 5QI identifier is 5QI 80. 5QI 80 can be used for low latency applications, such as augmented reality. As such, some applications may only function properly when at least the QoS as defined by 5QI 80 is provided to the UE while the application is being executed. Specifically, 5QI 80 may define: a non-guaranteed bit rate, a default priority level of 68, a maximum packet delay budget of 10 ms, and a maximum packet error rate of $10^{-6}$. While 5QI 80 is one example of a 5G QoS identifier, many others are possible.

A 5G cellular network can have many slices operating on the underlying physical architecture of the cellular network. A slice defines certain cellular network resources that are reserved for use. Therefore, a slice can be defined to give a piece of user equipment (UE) a guaranteed quality of service. Depending on the function or application that a UE is performing or executing, a different cellular network slice may be used. For example, in some arrangements, a UE may be permitted to access two slices. A first slice may be used for voice communications (e.g., phone calls) and can be referred to as the call bearer. A second slice may be defined with different parameters and may be used for all Internet traffic, which can be referred to as the Internet bearer.

Such an arrangement is relatively straightforward in which only one particular option exists for each type of service or function being accessed by the UE. However, in embodiments detailed herein, multiple slices may be available for network or Internet traffic. For example, an additional slice may be defined that conforms to the QoS characteristics of 5QI 80. UE are not configured to be able to select from multiple slices when such multiple slices are available for a given service type. Further, the cellular network operator may desire to direct particular application traffic onto or away from the 5QI 80 slice and/or some other 5QI identifier slices. As an example, an augmented reality application that requires a high level of service may be desired by the cellular network operator to access and use the 5QI 80 slice for communications while a gaming application may be desired by the cellular network operator to use a different Internet bearer slice.

Embodiments detailed herein allow the bearer to be selected based on the application that is launched for execution. In response to an application being launched on a cellular network-connected device, either the application directly or the operating system of the device causes an over the air (OTA) access point name (APN) list update request to be transmitted to an OTA update server system. The OTA update server determines what bearer the application is to use, such as based on a stored whitelist or other form of mapping of applications to bearers. The OTA update server responds to the request by updating the UE's APN list such that only a single bearer is available that the application can use. For example, only a single bearer that permits access to the Internet may be listed on the updated APN list. The application then accesses the cellular network using the bearer selected by the OTA update server.

Further detail regarding such embodiments and others is provided in relation to the figures. FIG. 1 illustrates an embodiment of example 5G Quality of Service identifiers (5QI), QoS parameters, and example services. In FIG. 1, GBR refers to a guaranteed bit rate and Non-GBR refers to a non-guaranteed bitrate. Example services represent possible uses of corresponding to such QoS parameters. A cellular network may have slices dedicated to some or all of the listed 5QI identifiers. While the embodiments detailed herein use 5QI 80 as an example for a 5QI that may be needed or desired to be used for various applications, the embodiments detailed herein can be used with any possible 5QI.

FIG. 2 illustrates an embodiment of a cellular network system 200 ("system 200"). System 200 can include a 5G New Radio (NR) cellular network; other types of cellular networks, such as 4G LTE, 6G, 7G, etc., are also possible. System 200 can include: UE 210 (UE 210-1, UE 210-2, UE 210-3); base station 215; cellular network 220; radio units 225 ("RUs 225"); distributed units 227 ("DUs 227"); centralized unit 229 ("CU 229"); and core 239. FIG. 2 represents a component level view. In a virtualized open radio access network (O-RAN), because components can be implemented as software in the cloud, except for components that need to receive and transmit RF, the functionality of various components can be shifted among different servers, for which the hardware may be maintained by a separate (public) cloud-service provider, to accommodate where the functionality of such components is needed.

UE 210 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a 5G interface, such as a 5G modem. Examples include sensor devices, Internet of Things (IoT) devices, manufacturing robots; unmanned aerial (or land-based) vehicles, network-connected vehicles, environmental sensors, etc. UE 210 may use RF to communicate with various base stations of cellular network 220. As illustrated, two base stations 215 (BS 215-1, 215-2) are illustrated. Real-world implementations of system 200 can include many (e.g., hundreds, thousands) of base stations, and many RUs, DUs, and CUs. BS 215 can include one or more antennas that allow RUs 225 to communicate wirelessly with UEs 210. RUs 225 can represent an edge of cellular network 220 where data is transitioned to wireless communication. The radio access technology (RAT) used by RU 225 may be 5G New Radio (NR), or some other RAT, such as 4G Long Term Evolution (LTE). The remainder of cellular network 220 may be based on an exclusive 5G architecture, a hybrid 4G/5G architecture, a 4G architecture, or some other cellular network architecture. Base station equipment 221 may include an RU (e.g., RU 225-1) and a DU (e.g., DU 227-1) located on site at the base station. In some embodiments, the DU may be physically remote from the RU. For instance, multiple DUs may be housed at a central location and connected to geographically distant (e.g., within a couple kilometers) RUs.

One or more RUs, such as RU 225-1, may communicate with DU 227-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 227-1, may communicate with CU 229. Collectively, RUs, DUs, and CUs create a gNodeB, which serves as the radio access network (RAN) of cellular network 220. CU 229 can communicate with core 239. The specific architecture of cellular network 220 can vary by embodiment. Edge cloud server systems outside of cellular network 220 may communicate, either directly, via the Internet, or via some other network, with components of cellular network 220. For example, DU 227-1 may be able to communicate with an edge cloud server system without routing data through CU 229 or core 239. Other DUs may or may not have this capability.

Figure 3:
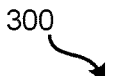
FIG. 3 illustrates an embodiment of a system that updates an access point name (APN) list based upon an operating system trigger of a user equipment (UE).

FIG. 3 illustrates an embodiment of a system 300 that updates an access point name (APN) list based upon an operating system trigger of the UE. System 300 can include: UE 310; RAN 320; and OTA update server 330. System 300 can operate using system 100 of FIG. 1. In FIG. 3, UE 310 represents an example of a UE; in a real-world implementation, hundreds or thousands of UE may be present. Conventional components of UE 310, such as a cellular radio, battery, and user interface are not illustrated. RAN 320 can represent a gNodeB through which UE 310 communicates with OTA update server 330. It may also be possible for communication with OTA update server 330 to occur via a different network, such as the Internet 321, if such a network connection is available. OTA update server 330 may function as part of core 139 or can be a separate system external to core 139. As previously mentioned, functions of core 139 can be implemented on a public cloud computing system. Accordingly, the functions of OTA update server 330 may also be implemented on a public cloud computing platform, either as part of core 139 or as a separate cloud-based system. OTA update server 330 can be part of the cellular network itself or can be operated separate and distinct of the cellular network.

On UE 310, processing system 311 is present. Processing system 311 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD).

Such non-transitory processor-readable mediums may be used as storage 313 to store one or more applications. By way of example only, FIG. 3 illustrates three applications (214-1, 314-2, and 314-3) stored by storage 313. Applications can come pre-installed by a manufacturer or may be acquired at a later time by a user, such as via an application ("app") store, such as Google's Play Store or Apple's App Store. Each application can be at least partially stored locally using storage 313. In response to a user command, such as selection of an icon on a touchscreen corresponding to the application, the application may be launched. Launch of execution of an application may also be triggered by the UE itself or a remote command. For example, a remote command may be transmitted to a UE that indicates a particular application is to be launched for execution. In some embodiments, operating system 312 may determine an application of applications 314 to be launched, such as an application that checks for updates. As part of launch, the application being launched may send an indication of one or more desired bearers, possibly in the form of a ranking, to operating system 312.

In response to an application being launched for execution, APN trigger engine 316, which may function as a component of the UE's operating system 312, may cause a request to be transmitted to OTA update server 330. The request may include information including an identifier of the application that has been launched (or otherwise activated). The request can include other information, such as an identifier of UE 310. In some embodiments, the request can include an indication of a requested slice or bearer. The request is transmitted to OTA update server 330 via RAN 320, which is visually represented as a tower in FIG. 3.

Upon receipt of the request, OTA APN update engine 331 can analyze the request and use application APN mapping 332 to determine what, if any, update should be sent to UE 310. If the application is mapped to a particular bearer in application APN mapping 332, the mapped APN associated with the proper bearer is retrieved. Application APN mapping 332 may function as a whitelist in that only particular applications are permitted to use particular slices of the cellular network. Such an arrangement can help prevent an application from requesting a particular bearer which it is not authorized to use by the cellular network operator. As an example of APN mapping 332, Table 1 is presented as an example:

TABLE 1

| Application Identifier | Permitted 5QI(s) |
|---|---|
| DA48C1 | 80 |
| 17AB008 | 2, 7 |
| 271312A | 6 |
| 1986BF8 | 4 |

It may be possible that more than one bearer is listed in APN mapping 332. APN trigger engine 316 can send an indication of a requested bearer or a ranking of requested bearers. In a first example, for the application with an identifier of 17AB008, if the requested bearer was 7, OTA update server 330 would respond with an APN update message that so updates the bearer because bearer 7 is authorized. As a second example, for the same application, if the requested bearer ranking was "70, 7", OTA update server 330 would respond with an APN update message that so updates the bearer because bearer 7 is authorized and bearer 70 is not authorized for the application.

In response to determining that the application is mapped to a particular bearer on a cellular network slice, an update message is transmitted to UE 310 by OTA APN update engine 331 using RAN 320. This message causes APN list 315 to be updated. APN list 315 may be stored using storage 313 or some other storage onboard UE 310, such as a subscriber identification module (SIM) card. The message causes APN list 315 to be updated such that the only bearer eligible to be used by the application selected for execution is the bearer determined by OTA APN update engine 331. APN list 315 may still list multiple bearers, but only one bearer eligible for use by the application may be listed. As an example, updated APN list 315 may list an Internet bearer and a voice bearer. If OTA APN update engine 331 determined that a bearer that performs to 5QI 80 parameters is to be used as the Internet bearer, APN list 315 may be updated to remove other Internet bearers that the application is permitted to use such that only the 5QI 80 bearer is present on APN list 315 for network access while the application is executing.

The application may then use the bearer determined by OTA update server 330 and listed in updated APN list 315 for communications while the application is active. Upon another function or application being executed, the process may repeat to again modify APN list 315.

Figure 4:
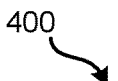
FIG. 4 illustrates an embodiment of a system that updates an APN list based upon an application of a UE.

FIG. 4 illustrates an embodiment of a system 400 that updates an APN list based upon an application of a UE. In contrast to system 300, rather than operating system 312 being responsible for sending APN update messages, the application launched for execution itself has been programmed to cause an APN update message to be transmitted to OTA update server 330. Unless specified otherwise, the components of system 400 function as detailed in relation to system 300 of FIG. 3.

In some embodiments, not all of applications 314 may be programmed to request a specific bearer. If an application, such as application 314-1, does not request a specific bearer, the operating system may transmit a request to OTA update server 330 to cause APN list 315 to be updated to include only a default bearer available for all applications. Alternatively, a default APN list may be stored which is reloaded when application 314-2 stops executing.

In response to a user command, such as selection of an icon on a touchscreen corresponding to the application, an application may be launched for execution from applications 314. As illustrated, for example, application 314-2 has been launched for execution. Launch of an application may also be triggered by the UE itself or a remote command. For example, a remote command may be transmitted to a UE that indicates a particular application is to be launched for execution. In some embodiments, operating system 312 (not illustrated in FIG. 4) may determine an application of applications 314 to be launched.

As part of a startup of application 314-2, a component of application 314-2, referred to as APN request engine 410 may check to see what bearer(s) are available in APN list 315. In some embodiments, if only a single bearer is listed in APN list 315 and this bearer matches a desired bearer of APN request engine 410, no further action by APN request engine 410 is needed.

If the bearer does not match the desired bearer of APN request engine 410, a request message can be transmitted to OTA update server 330. As previously detailed, this request can be sent via the cellular network (as represented by RAN 320) or via another communication path, such as Internet 321 (not illustrated in FIG. 4). As an example, while a connection to Internet 321 may be available via a WiFi network at the time application 314-2 is launched, this connection may not remain continuously available, thus requiring the application to use the cellular network for network communication.

The request message transmitted to OTA update server 330 can include an identifier of application 314-2, an identifier of UE 310, and, possibly, a request for a particular bearer or a ranked listing of bearers.

Upon receipt of the request, OTA APN update engine 331 can analyze the request and use application APN mapping 332 to determine what, if any, update should be sent to UE 310. If the application is mapped to a particular bearer in application APN mapping 332, the mapped APN associated with the proper bearer is retrieved. Application APN mapping 332 may function as a whitelist in that only particular applications are permitted to use particular slices of the cellular network. In embodiments of system 400, since application 314-2 is creating the request itself, the request could potentially request a bearer that application should not be permitted to use. Therefore, application APN mapping 332 can prevent an improper bearer from being used. If the request message included a requested bearer or ranked list of bearers, OTA APN update engine 331 may determine whether the requested bearer is permitted for the application or may determine the highest ranked bearer permitted to be used by the application.

In response to determining that the application is mapped to a particular bearer on a cellular network slice, an update message is transmitted to UE 310 by OTA APN update engine 331 using RAN 320. This message causes APN list 315 to be updated. APN list 315 may be stored using storage 313 or some other storage on-board UE 310, such as a subscriber identification module (SIM) card. The message causes APN list 315 to be updated such that the only bearer eligible to be used by the application selected for execution is the bearer determined by APN request engine 410. APN list 315 may still list multiple bearers, but only one bearer eligible for use by the application may be listed. As an example, updated APN list 315 may list an Internet bearer and a voice bearer. If OTA APN update engine 331 determined that a bearer that performs to 5QI 80 parameters is to be used as the Internet bearer, APN list 315 may be updated to remove other Internet bearers that the application is permitted to use such that only the 5QI 80 bearer is present on APN list 315 for network access while the application is executing.

The application may then use the bearer determined by OTA update server 330 and listed in updated APN list 315 for communications while the application is active. Upon another function or application being executed, the process may repeat to again modify APN list 315.

Various methods may be performed using the systems of FIGS. 1 through 4. FIG. 5 illustrates an embodiment of a method 500 for causing an application executed by a UE to use a particular bearer for network access. Method 500 can be performed using system 300 or system 400, which can be a part of cellular network system 200 of FIG. 2.

At block 510, an application is launched for execution on the UE. Input can be received that causes the application to be launched for executing on a UE. The input can be received from a user, such as by the user selecting an application for execution on the UE. Launch of an application can also be triggered at the UE remotely, such as via a network from a remote system. Launch of an application can be performed according to a predefined and stored schedule. The operating system of the UE can launch an application. An application can be launched on a reboot or power up of the UE. Other possible triggers or inputs can serve to cause an application to launch.

At block 520, in embodiments where the operating system controls transmission of the APN update request, an application having been launched can be determined by the APN trigger engine operating as part of the operating system.

At block 530, in response to the application being determined to launch, an APN update request can be transmitted. The APN update request can be created by the APN trigger engine of the operating system or by the application itself. If created by the application, block 520 may not be performed. The APN update request can identify the launched application, the UE, and possibly a desired bearer or ranking of bearers. In some embodiments, the current APN list of the UE is transmitted. The request can be transmitted to an OTA update server, which can be functioning as part of the cellular network such as part of the cellular network's core.

In some embodiments, the request is only transmitted if the application is using the cellular network for communication (e.g., Internet access). For example, if the UE is also connected to a local wireless network (e.g., WiFi network) and the application will use the local wireless network for communication, at least some steps of method 500 may not be performed. Alternatively, method 500 may still be fully performed in case the UE can no longer access the Internet via the local wireless network.

At block 540, the APN update request is analyzed by an OTA update server system to determine how, if at all, the APN list should be updated. In some embodiments, the application's identifier is used to look up a particular bearer that is to be used. If a bearer is determined, an APN update message is updated to ensure: 1) the particular bearer is listed; and 2) other bearers that could be used in place of the particular bearer are removed. For example, for an application that only uses an Internet bearer, a single Internet bearer may be included on the updated list. However, a voice bearer, which will not be used by the application, can additionally be part of the updated APN list.

At block 550, an OTA APN list update message is transmitted to the UE by the OTA update server system 230. This message can be transmitted via the cellular network. If an alternative data connection is available, such as via a local wireless network and the internet, the update message can be transmitted via it to the UE.

At block 560, in response to the received message, the APN list at the UE is updated based on the received OTA APN list update message. This update results in only one APN (and, thus one bearer/slice) being present on the list that is eligible for use by the application.

At block 570, as a consequence of only the one bearer being available for use, at block 360, this bearer, as selected by OTA update server system 230 and indicated in the OTA APN list update message, is accessed by the UE for communication on the cellular network by the application, such as to access a remote server system via the Internet. At block 580, the bearer/slice of the cellular network indicated on the modified APN list is used for cellular network communications involving the application. Performance of the slice for the application is in accordance with the QoS parameters associated with the 5QI of the slice.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for cellular network slice management, the method comprising:

determining, by a user equipment (UE), that an application stored on the user equipment has been launched for execution;

in response to determining the application has launched for execution, transmitting an access point name (APN) list update request to a remote server system, wherein the APN list update request comprises an application identifier mapped to the application launched for execution;

analyzing, by the remote server system, the APN list update request based on the application identifier;

transmitting, by the remote server system, an APN list update to the UE based on analyzing the APN list update request;

updating, by the UE, a stored APN list based on the APN list update;

determining, by the UE, for the application, a bearer slice to use for cellular network communications based on the updated stored APN list; and communicating, by the UE, via the bearer slice of a cellular network for data communications of the application.

2. The method for cellular network slice management of claim 1, wherein the transmitted APN list update includes a single bearer slice specified for a service type mapped to the application.

3. The method for cellular network slice management of claim 2, wherein the bearer slice for the service type mapped to the application differs in the stored APN list from the APN list update.

4. The method for cellular network slice management of claim 3, wherein the service type is an Internet bearer.

5. The method for cellular network slice management of claim 1, wherein the APN list update request is transmitted via the cellular network to the remote server system.

6. The method for cellular network slice management of claim 5, wherein the remote server system is an over-the-air (OTA) update server system operating as part of the cellular network.

7. The method for cellular network slice management of claim 1, wherein the bearer slice meets quality of service (QoS) parameters consistent with 5G Quality of Service Identifier (5QI) 80.

8. The method for cellular network slice management of claim 1, wherein updating the stored APN list based on the APN list update comprises storing the updated stored APN list to a subscriber identification module (SIM) card of the UE.

9. A cellular network system, comprising:
a cellular network comprising an update server system and a plurality of base stations, wherein the update server system comprises an application access point name (APN) mapping database; and
a plurality of user equipment (UE), wherein each UE of the plurality of UE are configured to:
determine that an application stored on the user equipment has been launched for execution;
in response to determining the application has launched for execution, transmit an access point name (APN) list update request to the update server system, wherein
the APN list update request comprises an application identifier mapped to the application launched for execution; and
the update server system analyzes the APN list update request based on the application identifier and transmits an APN list update message to the UE based on analyzing the APN list update request;
receive the APN list update message from the update server system;
update a stored APN list based on the APN list update; and
communicate via a slice of the cellular network for data communications of the application determined based on the updated stored APN list.

10. The cellular network system of claim 9, wherein the transmitted APN list update indicates the slice specified for a service type mapped to the application.

11. The cellular network system of claim 10, wherein the slice for the service type mapped to the application differs in the stored APN list from the APN list update.

12. The cellular network system of claim 11, wherein the service type is an Internet bearer.

13. The cellular network system of claim 9, wherein the APN list update request is transmitted via the cellular network to the update server system.

14. The cellular network system of claim 13, wherein the update server system is an over-the-air (OTA) update server system operating as part of the cellular network.

15. The cellular network system of claim 9, wherein the slice meets quality of service (QoS) parameters consistent with 5G Quality of Service Identifier (5QI) 80.

16. The cellular network system of claim 9, wherein each UE of the plurality of UE being configured to update the stored APN list based on the APN list update comprises each UE of the plurality of UE being configured to store the updated stored APN list to a subscriber identification module (SIM) card.

17. A user equipment, comprising:
a processing system, comprising one or more processors, that executes an operating system, wherein the processing system is configured to:
determine that an application stored on the user equipment has been launched for execution;
in response to determining the application has launched for execution, transmit an access point name (APN) list update request to an update server system, wherein
the APN list update request comprises an application identifier mapped to the application launched for execution; and
the update server system analyzes the APN list update request based on the application identifier and transmits an APN list update message to the UE based on analyzing the APN list update request;
receive the APN list update message from the update server system;
update a stored APN list based on the APN list update; and
communicate via a slice of a cellular network for data communications of the application determined based on the updated stored APN list.

18. The user equipment of claim 17, wherein the transmitted APN list update includes a single bearer slice specified for a service type mapped to the application.

19. The user equipment of claim 18, wherein the bearer slice for the service type mapped to the application differs in the stored APN list from the APN list update.

20. The user equipment of claim 18, wherein the user equipment is a cellular phone on which a user selects the application for launch via a touchscreen.

* * * * *